United States Patent Office 3,714,999
Patented Feb. 6, 1973

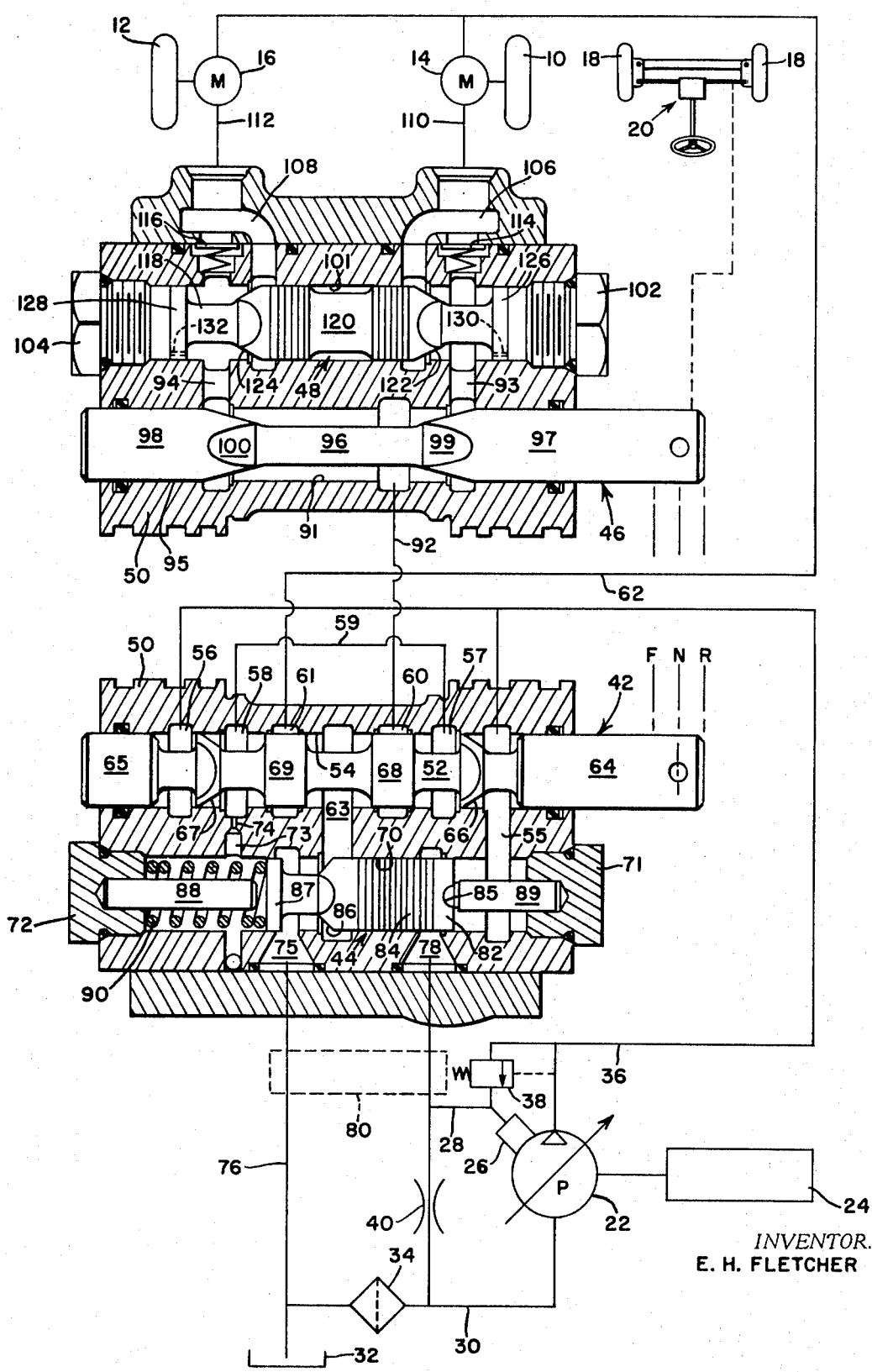

3,714,999
HYDROSTATIC DRIVE FOR VEHICLE
Edward Horton Fletcher, Waterloo, Iowa, assignor to Deere & Company, Moline, Ill.
Filed Jan. 29, 1971, Ser. No. 110,852
Int. Cl. B62d 11/04
U.S. Cl. 180—6.48                        12 Claims

ABSTRACT OF THE DISCLOSURE

A vehicle has a pair of rear drive wheels respectively driven by a pair of hydraulic motors and a pair of steerable front wheels. The hydraulic motors are driven by fluid pressure supplied by a variable displacement hydraulic pump through a valve system that includes a manually shiftable speed and direction control valve having a variable orifice through which the pressurized fluid flows. A flow control valve is responsive to the pressure drop across the variable orifice to control the flow of fluid to a pressure responsive stroke control system associated with the pump. The pressurized fluid from the speed and direction control valve is delivered to the respective motors through a flow divider valve actuated by the steering mechanism to throttle the flow of fluid to the wheel motor on the inside of the turn. The fluid also flows through a differential control valve which operates to restrict the fluid flow to the motor having the lesser load and consequently the lesser pressure, providing a limited slip differential action. The flow control valve is also connected to the return line to provide dynamic breaking after it causes the pump to go out of stroke.

BACKGROUND OF THE INVENTION

This invention relates to a hydrostatic drive and more particularly to a novel control system for such a drive, wherein a single variable displacement hydraulic pump drives a pair of wheel motors, such a drive having particular utility on vehicles such as tractors or the like.

It is known to provide a hydrostatic drive for a vehicle wherein a pump supplies pressurized fluid to a pair of wheel motors through control valving, which controls the rate of flow to the wheel motors and consequently the speed of the vehicle. It is also known to provide a hydrostatic drive having a variable delivery pump supplying pressurized fluid at a variable rate to the motors, the displacement of the pump being controlled by manually actuated means.

SUMMARY OF THE INVENTION

According to the present invention, a novel control system is provided for a hydrostatic drive having a variable delivery pump and a pair of hydrostatic wheel motors.

An important feature of the control system resides in the fact that the speed of the vehicle is maintained at the selected rate regardless of the load. Also according to the invention, the displacement of the pump, which controls the speed of the vehicle, is responsive not to the pressure of the fluid delivered to the motors but rather to the flow rate of the fluid, so that the pump displacement control is independent of the load on the motors.

Another feature of the control system resides in the fact that the pump displacement control is responsive to the rate of fluid flow to the displacement control means, which in turn is controlled by a valve responsive to the pressure drop across a variable orifice through which the fluid flows from the pump to the motors. Another feature of the control system resides in the provision of dynamic breaking, which results from the restriction of fluid flow from the motors when fluid is still circulated through the motors even though the pump is placed out of stroke, such as when the vehicle is moving downhill at a faster rate than selected.

Another feature of the control system resides in the provisions of valve means for restricting the flow of fluid to the motor having the lesser pressure, thereby providing a limited slip differential, which prevents excessive slippage of one wheel due to changes in traction conditions.

Still another feature of the control system resides in the provision of flow divider valve which divides the flow of fluid from the pump to the two motors and which is connected to the vehicle steering mechanism to throttle the flow of fluid to the motor on the inside of the turn, the resulting torque bias allowing a shorter turning radius and better maneuverability of the vehicle.

Still another feature of the invention resides in the low cost and relatively simple construction of the drive system, which utilizes several commercially available components.

BRIEF DESCRIPTION OF THE DRAWING

The sole figure is a partly schematic view of the hydrostatic drive system, showing the valves in section, the speed and direction valve being shown in its neutral condition and the steering mechanism being positioned for straight ahead operation of the vehicle.

DESCRIPTION OF THE PREFERRED EMBODIMENT

The invention is embodied in a hydrostatic drive system for a vehicle having a pair of rear drive wheels 10 and 12, respectively driven by hydraulic motors 14 and 16, and a pair of steerable front wheels 18, which are steered by a conventional steering mechanism, indicated in its entirety by the numeral 20.

A variable displacement hydraulic pump 22 is driven by an engine 24, the pump 22 being of well known construction and having a stroke control or displacement varying means 26 responsive to the fluid pressure in a stroke control passage 28, whereby an increase in pressure in the passage 28 tends to decrease the displacement of the pump. U.S. Pat. 3,002,462 to Raymond issued Oct. 3, 1961, for example, discloses a pump of this type, wherein pressure from the stroke control passage is directed to the interior of the pump housing to lift the pistons from the actuating cam and thereby reduce the output of the pump. The pump could also be of the swash plate type, wherein the stroke control means 26 would be a hydraulic cylinder, which adjusts the angle of the swash plate to vary the pump displacement, the cylinder again being responsive to the pressure in the stroke control passage 28.

The pump 22 has an associated inlet line 30, connected to a reservoir 32 through an oil filter 34, and an outlet line 36, as is conventional. A relief valve 38 is connected to the outlet line 36 and the stroke control passage 28 to deliver fluid pressure to the stroke control passage when the pressure in the outlet line exceeds a predetermined value, the pressure in the stroke control passage tending to put the pump out of stroke, thereby limiting the maximum output pressure of the pump. The pressurized fluid in the stroke control passage is bled to the inlet line 30 through an orifice 40, the constant bleed-off of pressure from the passage 28 establishing a minimum flow and displacement in the system sufficient to maintain a minimum pressure in the system.

The pump outlet line 36 and the reservoir 32 are connected to the motors 14 and 16 by a control system including a speed and direction control valve 42, a flow control valve 44, a flow divider valve 46, and a differential control valve 48. All of said valves are mounted in a single housing or body 50, which is shown in two parts in the drawing since the valves are shown in two sections through the same valve body. The speed control valve 42 comprises a spool-type valve member 52 axially slidable in a cylindrical bore 54 in the housing 50, the valve member being shown in its neutral position and being shiftable in either direction therefrom to the positions indicated by the reference lines in the drawings labeled F and R, which represent "full forward" and "full reverse" conditions. The valve member 52 can be controlled by the operator from the operator's station through any suitable linkage.

The valve bore 54 has a pair of radially extending inlet or pressure passages 55 and 56 adjacent its opposite ends, the passages 55 and 56 being connected to the pump outlet line 36. A second pair of radially extending passages 57 and 58 are respectively disposed inwardly of the pressure passages 55 and 56 and are connected by a conduit 59. A motor inlet passage 60 intersects the valve bore 54 inwardly of the passage 57, and a motor return passage 61 intersects the valve bore inwardly of the passage 58 and is connected to the motors 14 and 16 by a line 62, which functions as a return line when the motors are driven in a forward direction but is pressurized when the motors are driven in reverse. A return passage 63 intersects the bore 54 between the passages 60 and 61 and extends downwardly to the flow control valve 44. The valve member 52 has a pair of lands 64 and 65 at its opposite ends for sealing the opposite ends of the valve bore 54, and a pair of tapered lands 66 and 67 form variable orifices respectively between the passages 55 and 57 and between the passages 56 and 58, the size of the orifice depending on the position of the valve member 52. A pair of axially spaced lands 68 and 69 are disposed in the central part of the valve member interiorly of the variable orifices, the valve land 68 closing the passage 60 and the valve land 69 closing the passage 61 when the valve member is in its neutral condition as illustrated.

The flow control valve 44 is disposed below the direction and speed control valve 42 and includes a cylindrical valve bore 70 having its opposite ends closed by a pair of plugs 71 and 72. The right-hand pressure inlet passage 55 intersects the valve bore 70 as well as the valve bore 54 so that the right end of the valve 44 is subjected to the pump outlet pressure. The left end of the valve 44 has a radially extending passage 73 connected to the passage 58 of the speed control valve 42 through an orifice 74. The valve bore 70 is also intersected by a return passage 75, connected to the reservoir 32 by a return line 76, and by a stroke control outlet 78, which is connected to the stroke control passage 28. The hydraulic system can also be used for auxiliary hydraulic functions in addition to driving the vehicle, the auxiliary functions being represented by the dotted line box 80, which is connected to both the stroke control outlet 78 and the return line 76, the pressure from the stroke control outlet being used as the pressure source for the auxiliary function. For example, in a tractor or the like, the auxiliary functions 80 could represent power steering, power brakes, remote cylinders, or the like.

A valve member or piston 82 is mounted in the valve bore 70 for axial shifting therein and includes a valve land 84 having radially extending grooves 85 on its right-hand end and a tapered element 86 at its left-hand end. Fluid flow from the inlet passage 55 to the stroke control outlets 78 is metered through the grooves 85, while the tapered element 86 forms a variable orifice between the return passage 63 and the return passage 75. A second valve land 87 is disposed at the left end of the valve member and is engageable by a stop 88 in the form of an axially extending pin projecting from the end plug 72. The movement of the valve member 82 to the right is similarly limited by a stop 89 formed by a pin extending axially from the right end plug 71. A compression spring 90 operates between the left end plug 72 and the valve member 82 to bias the valve member toward the stop 89.

The flow divider valve 46 includes a cylindrical valve bore 91 intersected by a passage 92 connected to the passage 60 of the direction and speed control valve 42. The differential control valve also has a pair of radially extending outlet passages 93 and 94 disposed on opposite sides of the passage 92. A cylindrical valve member 95 extends through the bore 91 and is axially shiftable therein, the right end of the valve member 95 being connected to the steering mechanism 25 through a suitable linkage, so that the valve member shifts to the left when the vehicle is turned to the right and similarly shifts to the right when the vehicle is turned to the left. The valve member has a central recessed portion 96 between opposite end portions or lands 97 and 98 and tapered areas 99 and 100 respectively between the recessed portion 96 and the ends 97 and 98, the tapers 99 and 100 being respectively opposite the outlet passages 93 and 94 to form a variable orifice between the inlet 92 and the respective outlet passages.

The differential control valve 48 includes a cylindrical bore 101 having its opposite ends closed by plugs 102 and 104. The bore 101 is intersected by the right and left outlet passages 93 and 94, and right and left motor passages 106 and 108 respectively intersect the bore 101 adjacent the passage 93 and 94, the motor passages in turn being respectively connected to the right and left motors 14 and 16 through hydraulic lines 110 and 112. A check valve 114 is disposed between the passage 93 and the passage 106 to permit the flow of fluid from the passage 106 to the passage 93 only, while a similar check valve 116 is disposed between the left motor passage 108 and the passage 94 to permit flow of fluid only from the passage 108 to the passage 94.

A piston-type valve member 118 is mounted in the bore 101 and includes a central land area 120 having tapers 122 and 124 at its opposite ends respectively opposite the motor passages 106 and 108, the tapers forming variable orifices from the respective passages 93 and 94 to the passages 106 and 108. The valve member has valve lands 126 and 128 at its opposite ends with axially extending orifices 130 and 132 respectively extending through the valve lands to respectively connect the opposite ends of the valve member to the passages 93 and 94.

In operation, when the direction and speed control valve 42 is placed in a neutral position, as illustrated in the drawing, the variable orifices 66 and 67 are closed so that the passages 57 and 58 and consequently the chamber at the left end of the flow control valve 44 are disconnected from the pressure source. However, the right end of the flow control valve 44 is still pressurized through the passage 55, and the pressure imbalance overcomes the bias of the spring 90 to shift the flow control valve member 82 to the left. This, of course, connects the stroke control outlet 78 with the passage 55 through the grooves 85 and the resulting pressure in the stroke control passage 28 tends to put the pump out of stroke. The stroke control pressure leaks off through the orifice 40, so that the pump is maintained at a displacement sufficient to compensate for the bleed-off through the orifice 40. Thus, pump displacement and output pressure are stabilized at the pressure and flow required to keep the pump at its minimum displacement.

Forward motion of the vehicle is initiated by moving the direction and speed control valve 42 to the left in the drawing to establish a flow from the pump outlet line 36 through the variable orifices 66 and 67 to the connected passages 57 and 58. Two inlets and two variable orifices are used to reduce flow losses at full speed operation. Since the valve land 68 has uncovered the passage 60, the pressurized fluid in the passages 57 and 58 flows through the passage 60 to the flow divider valve 46. The pressure in the passages 57 and 58 is also communicated to the left end of the flow control valve 44 through the orifice 74 and the passage 73. The spring 90 initially shifts the valve member 82 to the right, which closes the passage 78, whereby the pump tends to go into stroke as pressure bleeds off through the orifice 40. As the pump goes into stroke, the pressure builds up as required to run the motors 14 and 16 and the flow is established through the variable orifices 66 and 67. The flow through the orifices creates a pressure drop across the orifices, so that a lesser pressure is exerted on the left end of the valve member 82 than on the right end. Thus, the pressure drop across the orifices tends to bias the valve member to the left, while the spring 90 biases the valve member in the opposite direction. The flow increases until the pressure drop is such that the valve member 82 moves a sufficient distance to the left to uncover the passage 78 to again deliver pressurized fluid to the stroke control passage 28, which, of course, tends to reduce the displacement of the pump. Thus, the valve member 82 meters pressurized fluid to the stroke control passage 28 through the grooves 85 on the end of the valve member. The pressure drop across the variable orifices is independent of the load on the motors, and therefore the pump displacement and consequently the flow rate to the motors is maintained at the desired rate independent of motor load, the valve member 82 being modulated in response to the pressure drop across the variable orifices. Of course, the position of the direction and speed control valve controls the size of the variable orifices and therefore establishes the flow rate necessary to obtain the necessary pressure drop to stabilize the pump displacement. For example, when the valve member 52 is positioned for maximum forward speed, it is at its furthest position to the left, providing the variable orifices 66 and 67 with their greatest opening so that a maximum flow rate is necessary to establish the necessary pressure drop. Conversely, when the variable orifices have only a very small opening, only a small flow rate is necessary to produce the required pressure drop to stabilize the pump displacement.

As is apparent, when the valve member 52 is moved to the left for forward operation of the vehicle, the valve land 69 uncovers the passage 61 to connect the return line 62 to the return passage 63 and ultimately to the reservoir via the passage 75 and the return line 76. The pressurized fluid in the inlet passage 92 is divided by the flow divider valve 46 into the two outlet passages 93 and 94. The pressures in the passages 93 and 94 are respectively communicated to the opposite ends of the differential control valve 48 through the respective damping orifices 130 and 132 and when the pressures in the passages 93 and 94 are substantially equal, the valve member 118 is in its centered position as illustrated, wherein the orifices formed by the tapered portions 122 and 124 are equal to maintain equal flow rates to the two motors 14 and 16. If the loads on the motors are equal, the pressure in the passages to the two motors will also be equal so the differential control valve will remain centered without restricting the flow to either motor. However, if the load on one motor is greater than the other, the resulting increase in pressure in the passage to the motor with the greater load will shift the valve member 118 toward the side of the lighter load to restrict the flow to the motor with the lighter load. For example, if the left-hand wheel 12 lost its traction and started slipping, the pressure in the left motor passage 108 would suddenly drop, and the resulting decreases in pressure at the left end of the value would cause the valve member 118 to shift to the left, so that the tapered portion 124 of the central valve land 120 would restrict the flow to the passage 108 and consequently to the left motor. The orifices 130 and 132 act as damping orifices to delay the reaction of the valve member 118 so that it does not respond to minor fluctuations in pressure. As is apparent, the differential control valve thus provides a limited slip differential.

For reverse operation, the valve member 52 of the direction and speed control valve is shifted to the right from its neutral position. The operation of the variable orifices and the flow control valve 44 are the same as described above. However, in reverse positions, the pressurized passages 57 and 58 are connected to the passage 61, which is connected to the opposite sides of the wheel motors 14 and 16 via the hydraulic line 62, while the passage 60, which is connected to the hydraulic motor lines 110 and 112 via the flow divider valve 46 and the differential control valve 48, is connected to the return passage 63. Since the differential control valve is now in the return lines, it will not operate, and therefore check valves 114 and 116 are provided to bypass fluid around the orifices formed by the tapered portions 122 and 124 directly to the passages 93 and 94.

Dynamic braking is provided by the direction and speed control valve 42 and the flow control valve 44. With an overrunning load, such as when the vehicle is moving downhill at a greater speed than selected via the direction and speed control valve 42, the motors 14 and 16 act as pumps and the increased flow rate would tend to increase the pressure drop and consequently destroke the pump. However, since the pump is no longer acting as a pump, the de-stroking of the pump would not decrease the flow rate. However, as the flow rate increases, and consequently the pressure drop across the orifices 66 and 67, the valve member 82 starts shifting to the left, whereupon the tapered element 86 of the valve land 84 starts to restrict the flow from the passage 63 to the return passage 75, which applies a back pressure on the motors to brake the vehicle.

When the vehicle is turned via the steering mechanism 20, the valve member 95 of the flow divider valve 46 shifts to restrict the flow to the wheel motor on the inside of the turn. For example, if the steering mechanism 20 is turned to steer the vehicle to the right, the valve member 95 shifts to the left so that the variable orifice formed by the taper 99 restricts the flow from the inlet passage 92 to the outlet passage 93 and consequently to the right wheel motor 14.

As is apparent, the entire control system is relatively simple and utilizes relatively few components to produce the above-described results, all of which gives the control system particular utility on such vehicles wherein a high degree of maneuverability and control accuracy is desired at a relatively low price, such as in a small agricultural or garden tractor.

I claim:

1. In a vehicle having a power source and a pair of drive elements, the combination therewith of an improved hydrostatic drive comprising: first and second hydraulic motors respectively drivingly connected to the respective drive elements; a fluid pressure source including a variable displacement hydraulic pump driven by the power source and having an associated displacement varying means responsive to fluid pressure in a stroke control passage for varying the displacement of the pump, and means operatively connected to the pump, the stroke control passage, and the hydraulic motors for selectively supplying pressurized fluid from the pump to the motors and including a speed control valve means having a selectively variable orifice means through which the fluid flows from the pump to the motors, and a flow control valve means including a valve member having its opposite ends acted on by the fluid pressure on opposite sides of the orifice means and shiftable between alternate positions wherein it respectively connects or disconnects the stroke control passage and the fluid pressure source in response to the fluid pressure drop across said orifice means for controlling the flow of fluid to the stroke control passage, whereby the pump displacement is responsive to the position of the variable orifice means.

2. The invention defined in claim 1 wherein the valve member is biased in one direction by a valve spring and in the opposite direction by the pressure drop across the variable orifice means to modulate the flow of fluid to the stroke control passage.

3. The invention defined in claim 2 wherein the stroke control passage has a bleed-off orifice so that a predetermined flow from the flow control valve is required to maintain a given pump displacement.

4. The invention defined in claim 1 wherein the means connecting the pump to the motors includes a flow divider valve operative to divide the flow of fluid from the pump to the motors and the vehicle includes a steering mechanism and means operatively connecting the steering mechanism to the flow divider valve to shift the flow divider valve into alternate positions in response to shifting of the steering mechanism, whereby the flow divider valve decreases the flow of fluid to the motor for the side of the vehicle on the inside of the turn.

5. The invention defined in claim 1 wherein the means connecting the pump to the motors includes flow divider means operative to divide the flow of fluid from the pump into first and second conduit means respectively connected to the first and second motors, and differential control valve means associated with the first and second conduit means for restricting the fluid flow through one of said conduit means when the pressure therein falls below the pressure in the other conduit means.

6. The invention defined in claim 5 wherein the differential control valve means includes a valve bore intersected by the first and second conduit means at axially spaced intervals and an axially slidable piston mounted in the bore between the conduit means, the pressure in the first and second conduit means being applied to the opposite ends of the piston so that the piston shifts in response to a pressure differential in the first and second conduit means to increase the flow restriction in the conduit means having the lower pressure.

7. The invention defined in claim 1 wherein the means for connecting the pump and the hydraulic motors includes a return conduit means operative to return fluid from the motors to the pump and braking valve means disposed in the return conduit means and including a shiftable valve element responsive to the pressure drop across the variable orifice means and shiftable into a position wherein it restricts the flow of fluid through the return conduit means in response to a greater pressure drop across said variable orifice means than required to reduce the displacement of the pump.

8. The invention defined in claim 7 wherein the flow control valve member is biased in one direction by a valve spring and in the opposite direction by the pressure drop across the variable orifice means to modulate the flow of fluid to the stroke control passage, the valve member including the shiftable valve element which moves to its position wherein it substantially restricts flow through the return conduit means when the valve member shifts to a position wherein it delivers maximum flow to the stroke control passage.

9. In a vehicle having a power source and drive element means, the combination therewith of an improved hydrostatic drive comprising: hydraulic motor means drivingly connected to the drive element means; a variable displacement hydraulic pump driven by the power source and having an outlet line and displacement varying means operative to respectively increase or decrease the pump displacement in response to a decrease or increase in fluid pressure in a stroke control passage; means respectively connecting the pump outlet line to the motor means and including a speed control valve having a selectively adjustable variable orifice means through which the fluid flows from the pump outlet line to the motor means; and a flow control valve including a valve member having its opposite ends acted on by the fluid pressure on opposite sides of the variable orifice means and operatively connected to the pump outlet line and the stroke control passage so that the valve member shifts from a closed position to an open position wherein it connects the stroke control passage to the pump outlet line when the pressure drop across the variable orifice means reaches a first predetermined value and thereby decreases the pump displacement.

10. The invention disclosed in claim 9 wherein the stroke control passage has a bleed-off orifice so that the pressure in the stroke control passage decreases when the flow control valve is in its closed position to increase the pump displacement.

11. The invention disclosed in claim 9 and including a return conduit means operative to return fluid from the motor means to the pump and operatively connected to the flow control valve so that the shiftable flow control valve member restricts the flow of fluid through the return conduit means when the valve member shifts as a result of a pressure drop acting on the member in excess of a second predetermined value.

12. The invention disclosed in claim 11 wherein the second predetermined pressure drop is greater than the first predetermined pressure drop.

References Cited

UNITED STATES PATENTS

| | | | |
|---|---|---|---|
| 3,339,660 | 9/1967 | Budzich | 180—66 R X |
| 3,429,123 | 2/1969 | Burroughs | 60—52 VS X |
| 3,217,821 | 11/1965 | Dumas et al. | 180—6.48 |
| 3,195,669 | 7/1965 | Court | 180—66 R |
| 3,153,911 | 10/1964 | Mark et al. | 180—6.3 X |
| 3,114,424 | 12/1963 | Voreaux et al. | 180—6.3 |
| 3,233,691 | 2/1966 | De Biasi | 180—6.48 |
| 3,302,390 | 2/1967 | Christenson et al. | 60—52 VS X |
| 2,461,116 | 2/1949 | Jeffrey | 180—66 R |

BENJAMIN HERSH, Primary Examiner

L. J. PAPERNER, Assistant Examiner

U.S. Cl. X.R.

180—66 R; 60—52 VS